(12) United States Patent
Kim et al.

(10) Patent No.: US 8,054,352 B2
(45) Date of Patent: Nov. 8, 2011

(54) COLOR FILTER ARRAY WITH REDUCED CROSSTALK EFFECT AND IMAGE SENSOR AND IMAGE PICKUP APPARATUS HAVING THE SAME

(75) Inventors: Jung-Yeon Kim, Busan (KR); Hiromichi Tanaka, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 12/286,577

(22) Filed: Oct. 1, 2008

(65) Prior Publication Data
US 2009/0086065 A1   Apr. 2, 2009

(30) Foreign Application Priority Data
Oct. 1, 2007 (KR) .................. 10-2007-0098900

(51) Int. Cl.
   *H04N 5/335* (2006.01)
(52) U.S. Cl. .................................................. 348/280
(58) Field of Classification Search .................. 348/280, 348/277, 266, 279, 272, 294; 382/162, 167
   See application file for complete search history.

(56) References Cited

U.S. PATENT DOCUMENTS

| | | | | |
|---|---|---|---|---|
| 3,971,065 A * | 7/1976 | Bayer | | 348/276 |
| 7,456,878 B1 * | 11/2008 | Sun et al. | | 348/241 |
| 2002/0041331 A1 * | 4/2002 | Xiaomang et al. | | 348/234 |
| 2002/0181770 A1 * | 12/2002 | Jaspers | | 382/167 |
| 2003/0122946 A1 * | 7/2003 | Nishino et al. | | 348/297 |
| 2005/0244051 A1 * | 11/2005 | Shiohara | | 382/162 |
| 2005/0287479 A1 * | 12/2005 | Moon | | 430/330 |
| 2006/0066736 A1 * | 3/2006 | Tsuruoka | | 348/241 |
| 2006/0192882 A1 * | 8/2006 | Arakawa | | 348/333.12 |
| 2007/0127040 A1 * | 6/2007 | Davidovici | | 356/629 |
| 2007/0211308 A1 * | 9/2007 | Green | | 358/474 |
| 2008/0068476 A1 * | 3/2008 | Yun | | 348/280 |
| 2008/0195174 A1 * | 8/2008 | Walker et al. | | 607/44 |
| 2009/0027527 A1 * | 1/2009 | Pang et al. | | 348/280 |
| 2010/0254602 A1 * | 10/2010 | Yoshino | | 382/167 |

OTHER PUBLICATIONS

Korean Patent Publication No. 1020070039539 to Shuichi et al., having Publication date of Apr. 12, 2007 (w/ English Abstract page).
Japanese Patent Publication No. 19830100589 to Atsushi et al., having Publication date of Jun. 15, 1983 (w/ English Abstract page).
Japanese Patent Publication No. 59-051690 to Masuo et al., having Publication date of Mar. 26, 1984 (w/ English Abstract page).

(Continued)

*Primary Examiner* — Nicholas Giles
*Assistant Examiner* — Stephen Coleman
(74) *Attorney, Agent, or Firm* — Monica H. Choi

(57) ABSTRACT

An image sensor includes a color filter array including a primary color pixel such as a green filter pixel for sensing a predetermined primary color, a first secondary color pixel such as a yellow filter pixel, and a second secondary color pixel such as a cyan filter pixel. The primary color pixel, the first secondary color pixel, and the second secondary color pixel form different area ratios in the color filter array. For example, the area ratio of the yellow filter pixel to the cyan filter pixel and the green filter pixel is 2:1:1 in the color filter array. In addition, the color filters of the pixels are compensated for crosstalk effect. Such an image sensor has enhanced color reproducibility and sensitivity.

18 Claims, 14 Drawing Sheets

OTHER PUBLICATIONS

Japanese Patent Publication No. 06-125562 to Yoshiro, having Publication date of May 6, 1994 (w/ English Abstract page).

Japanese Patent Publication No. 2005-093659 to Kenzo et al., having Publication date of Apr. 7, 2005 (w/ English Abstract page).

* cited by examiner

COLOR FILTER ARRAY WITH REDUCED CROSSTALK EFFECT AND IMAGE SENSOR AND IMAGE PICKUP APPARATUS HAVING THE SAME

BACKGROUND OF THE INVENTION

This application claims priority under 35 USC §119 to Korean Patent Application No. 10-2007-0098900, filed on Oct. 1, 2007 in the Korean Intellectual Property Office, the disclosure of which is incorporated herein in its entirety by reference.

1. Field of the Invention

The present invention relates generally to image sensors, and more particularly to a color filter array for reducing crosstalk between pixels, an image sensor having the same, and an image pickup apparatus having the image sensor.

2. Background of the Invention

An image pickup apparatus includes a photo sensing device for converting light into electric signals. The image pickup apparatus is classified into a charge-coupled device (CCD) type and a CMOS image sensor (CIS) type depending on the kind of photo sensing device. The CIS type is currently used in many fields instead of the CCD type because of its characteristics of low-voltage operation, less power consumption, standard complimentary metal oxide semiconductor (CMOS) process and high integration as compared with the CCD type.

A CIS solid image pickup apparatus is installed in a portable camera, a digital still camera and the like to pick up images that are converted into electric signals that are transmitted to a digital signal processor. The digital signal processor performs signal processing on color image data (R, G, and B data) outputted from the CIS solid image pickup apparatus for driving a display apparatus such as a liquid crystal display (LCD).

Photo sensing devices generally sense only the intensity of received light and not the spectral characteristics. Thus, color filters are used for passing light frequencies in predetermined ranges to the photo sensing devices. Accordingly, respective color filters and photo sensing devices are used for a predetermined number of frequency ranges. As a result, the intensity of received light for each of the frequency ranges is determined for generating color image data (R (red), G (green) and B (blue) data).

SUMMARY OF THE INVENTION

In an aspect of the present invention, an image sensor includes a color filter array including a primary color pixel for sensing a predetermined primary color, a first secondary color pixel, and a second secondary color pixel. The first and second secondary color pixels sense the predetermined primary color as a frequency component. One of the first and second secondary color pixels form a higher area ratio in the color filter array.

In an example embodiment of the present invention, the primary color pixel is a green filter pixel, the first secondary color pixel is a yellow filter pixel, and the second secondary color pixel is a cyan filter pixel.

In that case, the area ratio of the yellow filter pixel to the cyan filter pixel and the green filter pixel is 2:1:1 in the color filter array.

In an embodiment of the present invention, the color filter array further includes a unit pixel having the green filter pixel, two of the yellow filter pixels, and the cyan filter pixel. For example, the two yellow filter pixels are diagonally aligned in the unit pixel, and the green filter pixel and the cyan filter pixel are diagonally aligned in the unit pixel.

In a further embodiment of the present invention, each of the primary color pixel, the first secondary color pixel, and the second secondary color pixel has a respective compensated color spectral characteristic that minimizes crosstalk from a respective set of surrounding pixels.

In another embodiment of the present invention, the image sensor further includes micro-lenses for gathering light, and the color filter array for color-filtering the gathered light from the micro-lenses. In addition, the image sensor also includes photo-sensing devices for converting the color-filtered light from the color filter array into electric signals.

The present invention may be practiced with the image sensor being a CMOS image sensor (CIS).

In another aspect of the present invention, an image pickup apparatus includes the image sensor and a signal processor for converting the electric signals from the image sensor into primary color signals.

In an example embodiment of the present invention, the signal processor includes a luminance generator, a color converter, and a color corrector. The luminance generator generates a luminance signal from an output signal generated by the unit pixel. The color converter generates temporal primary color signals from the output signal generated by the unit pixel. The color corrector generates enhanced primary color signals from the temporal primary color signals.

In this manner, the green filter pixel, the two yellow filter pixels, and the cyan filter pixel all sense the primary color of green as a frequency component for enhanced sensitivity. In addition, the color filters of such pixels are compensated for crosstalk resulting in enhanced color reproducibility of the image sensor.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2A, 2B, 3A.

Figure 1:
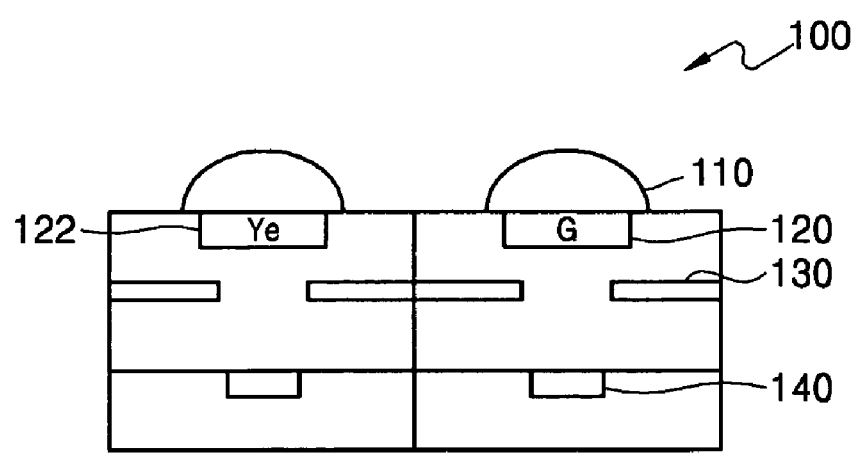
FIG. 1 is a cross-sectional view of an image sensor according to an embodiment of the present invention.

3B, 3C, 3D, 3E, 3F, 3G, 4A, 4B, 4C, 4D, 4E, 4F, 4G, 5A, 5B, 5C, 5D, 5E, 5F, 5G, 6, and 7 refer to elements having similar structure and/or function.

DETAILED DESCRIPTION OF THE INVENTION

The present invention is now described more fully hereinafter with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thickness of layers, films, and regions are exaggerated for clarity.

FIG. 1 is a cross-sectional view of an image sensor 100. The image sensor 100 includes microlenses 110, a color filter array including color filters 120 and 122, a photo shielding layer 130, and photo sensing devices 140. The microlenses 110 gather incident light from a light source. Each of the color filters 120 and 122 receives gathered light from a respective one of the microlenses 110 and transmits light of a respective predetermined frequency range. The photo shielding layer 130 prevents light from reaching other regions than the photo sensing devices 140.

Each of the photo sensing devices 140 receives the light transmitted through a respective one of the color filters 120 and 122 to generate an electric signal depending on the intensity of the received light. For example, received light with a higher intensity results in a higher magnitude of current generated in the respective photo sensing device 140, if such intensity is above a predetermined threshold value. The present invention may be practiced with the photo sensing device 140 including any device capable of converting light into electric signals such as a photodiode.

Figure 2A:
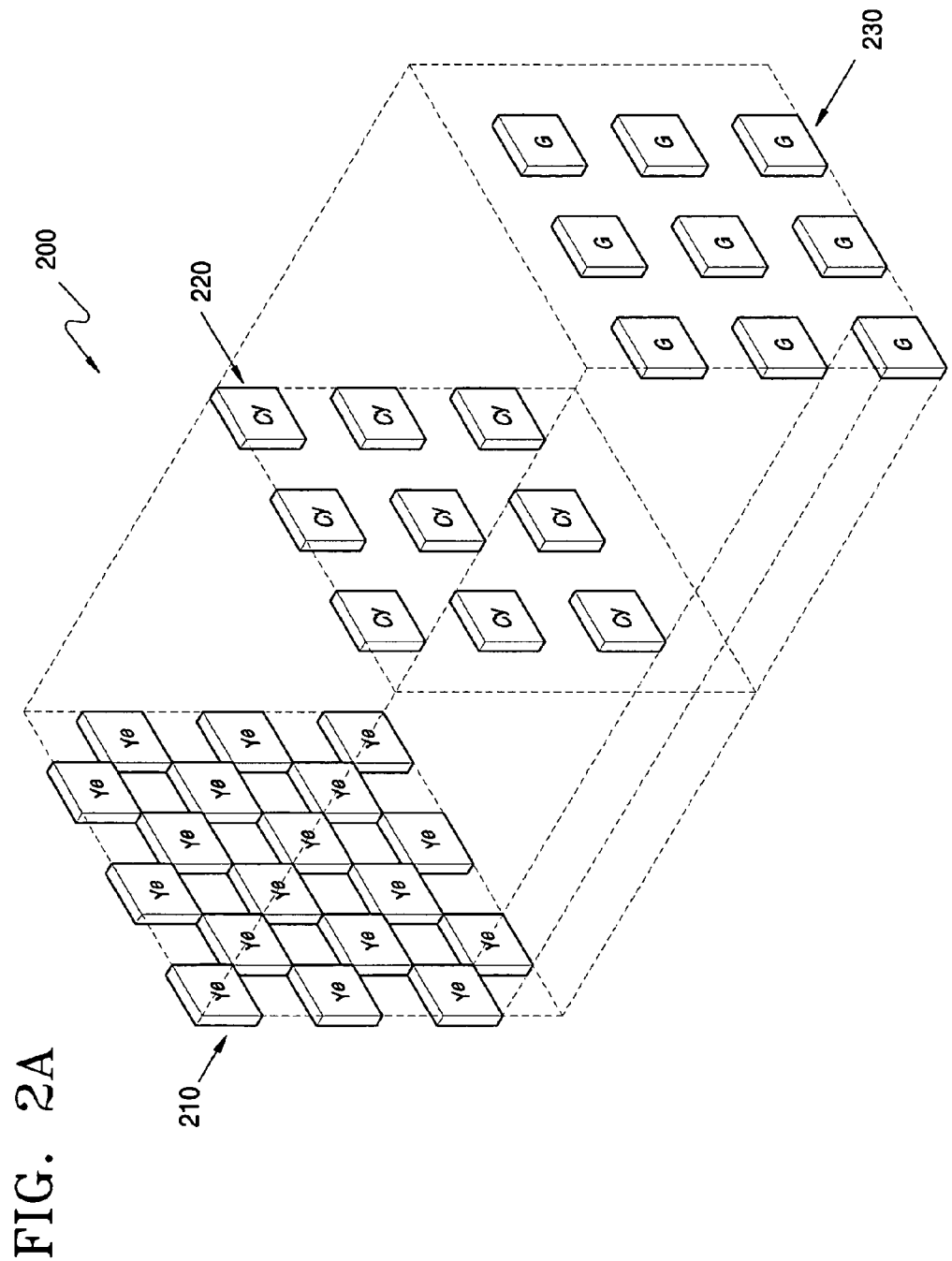
FIGS. 2A and 2B are views of a color filter array according to an embodiment of the present invention.
Figure 2B:
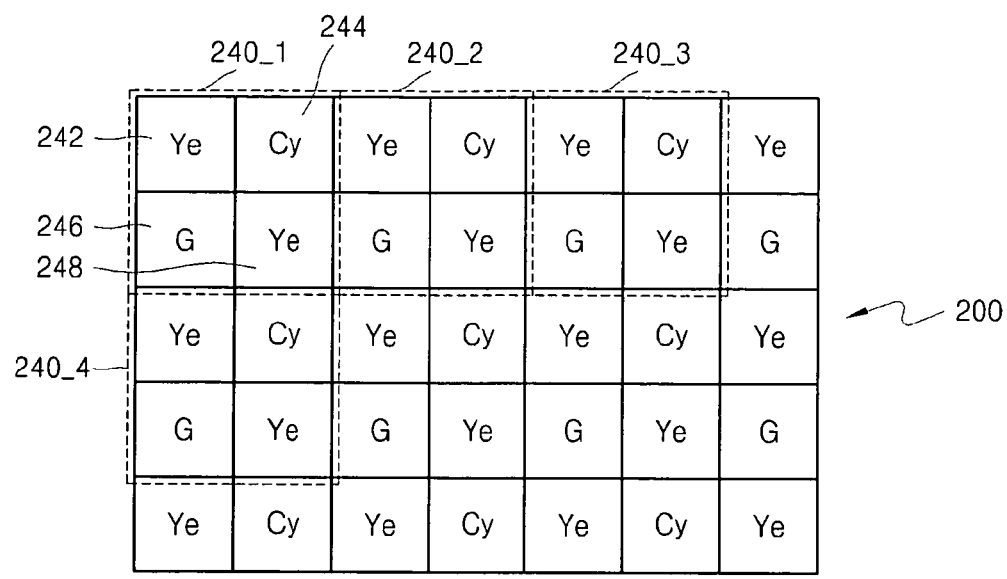

The photo sensing devices 140 are electrically isolated from the respective color filters 120 and 122. FIGS. 2A and 2B are views illustrating a structure of a color filter array 200 which may be part of the color filter array of FIG. 1, according to an embodiment of the present invention.

In general, red, green, and blue are the primary colors of light because any color of light can be generated by mixing such primary colors of light. For example, red and green light mixed together generate yellow light, green and blue light mixed together generate cyan light, and red and blue light mixed together generate magenta light. Thus, yellow, cyan, and magenta are referred to as secondary colors of light.

The color filter array 200 includes green filter pixels 230 that are primary color filters for transmitting light of the primary color, green. The color filter array 200 also includes yellow filter pixels 210 that are first secondary color filters for transmitting light of the secondary color, yellow. The color filter array 200 further includes cyan filter pixels 220 that are second secondary color filters for transmitting light of another secondary color, cyan.

In FIG. 2A, the yellow, cyan, and green filter pixels 210, 220, and 230 are shown on different planes only for illustrative purposes. In an example embodiment of the present invention, the yellow, cyan, and green filter pixels 210, 220, and 230 are formed on one plane as illustrated in FIG. 2B.

The color filter array 200 is formed by repeating unit pixels 240_1, 240_2, 240_3 and 240_4, each including four sub-pixels 242, 244, 246 and 248. Each of the sub-pixels 242, 244, 246 and 248 includes a respective color filter having a same predetermined area. Each unit pixel includes two yellow filter pixels 242 and 248 having respective yellow color filters for transmitting yellow light, one cyan filter pixel 244 having a respective cyan color filter for transmitting cyan light, and one green filter pixel 246 having a respective green color filter for transmitting green light.

Since all of the green, cyan, and yellow color filters transmit light of the green frequency range as a frequency component, optical sensitivity of the image sensor 100 is improved. Particularly with high integration of the pixels of the image sensor 100 for higher image quality, the size of the pixels in the image sensor 100 is decreased. Thus, the amount of light reaching each pixel is decreased.

When light is amplified, a SNR (signal to noise ratio) is decreased. The color filter array 200 passes more luminance components than that of a conventional image sensor for enhanced performance of the image sensor 100 that is highly integrated. Referring to FIG. 2B, the four sub-pixels 242, 244, 246 and 248 of each unit pixel 240 are arranged as a two by two array. The two yellow filter pixels 242 and 248 are disposed diagonally adjacent as illustrated in FIG. 2B. The cyan and green filter pixels 244 and 246 are disposed diagonally adjacent as illustrated in FIG. 2B. Such a color filter pattern of the pixel unit 240 is repeated along the row direction and the column direction in the color filter array 200.

Figure 7:
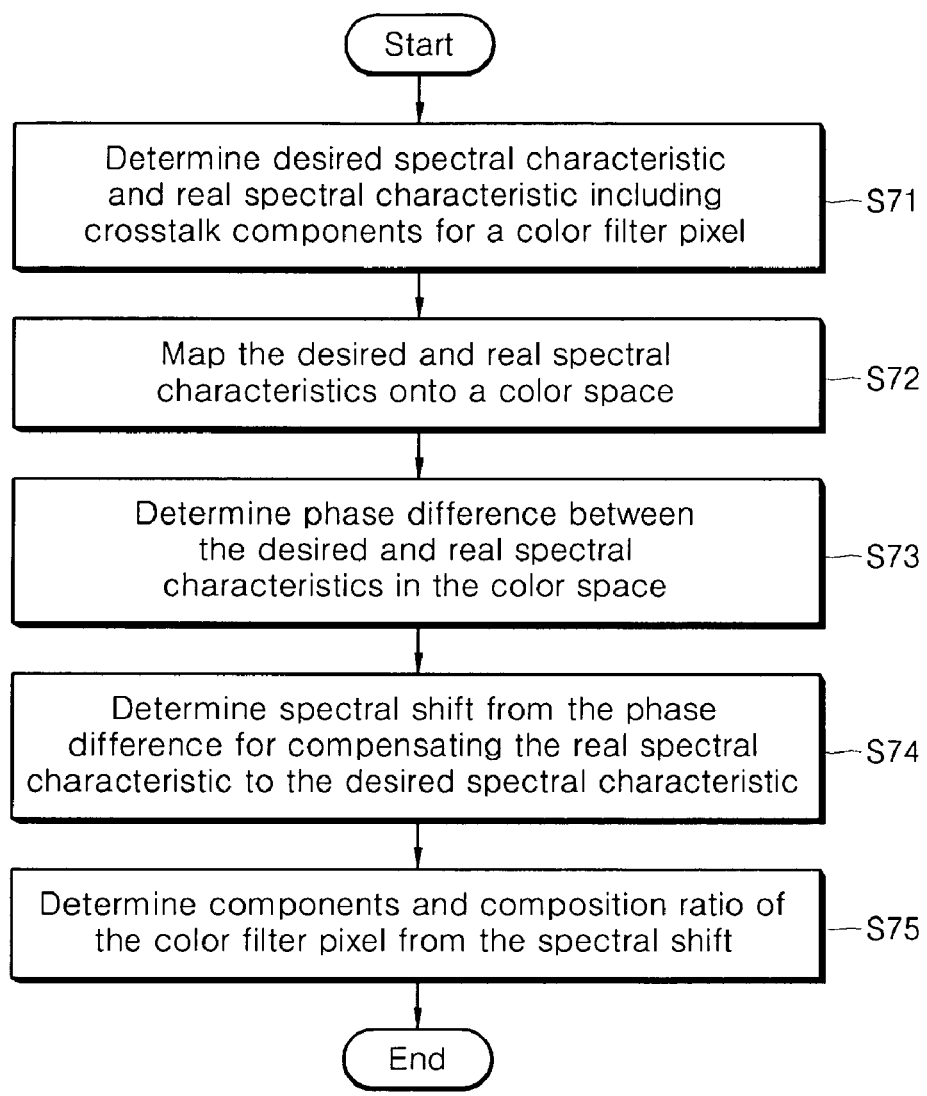
FIG. 7 is a flow-chart of steps during compensation for crosstalk effect in the yellow filter pixel, the cyan filter pixel, or the green filter pixel, according to an embodiment of the present invention.

FIGS. 3A, 3B, 3C, 3D, 3E, 3F, and 3G are views illustrating a process of obtaining a respective desired spectral characteristic of a yellow filter pixel that is compensated for crosstalk effect, according to an embodiment of the present invention. FIG. 7 is a flow-chart of steps during compensation for the crosstalk effect in the yellow filter pixel, the cyan filter pixel, or the green filter pixel, according to an embodiment of the present invention.

When the pixels of the image sensor are highly integrated, crosstalk between the pixels increases from decreased size of the pixels. Crosstalk refers to an affect on a given pixel from a signal generated in an adjacent pixel such that the spectral characteristic for the given pixel is changed resulting in deterioration in color reproducibility.

For preventing the affect of such crosstalk, the deterioration of color reproducibility due to the crosstalk is compensated for with a color correcting circuit in the conventional image sensor. However, since an amplifier and a matrix circuit are used in the conventional color correcting circuit, noise is amplified as well such that the SNR is decreased. Thus, color reproducibility is limited with the conventional color correcting circuit.

In an embodiment of the present invention, the color filters of the color filter array 200 are adjusted to compensate for such undesired crosstalk. For example, each color filter of the color filter array 200 has a respective spectral characteristic which is a plot of transmission level versus wavelength (i.e., frequency) of light. The respective spectral characteristic is adjusted by varying the composition and the composition ratio of pigments in the color filter.

Figure 3A:
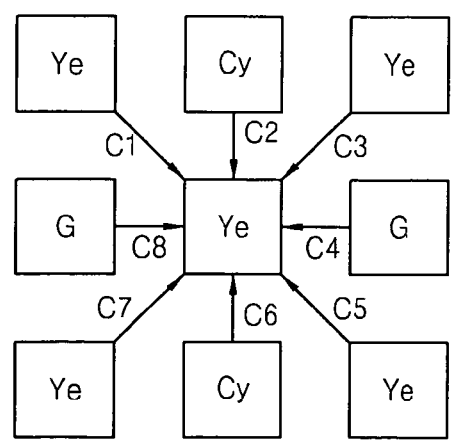
FIGS. 3A, 3B, 3C, 3D, 3E, 3F, and 3G are views illustrating a process of obtaining a respective desired spectral characteristic of a yellow filter pixel that is compensated for crosstalk effect, according to an embodiment of the present invention.

Referring to FIG. 3A, the yellow filter pixel is affected by crosstalk from adjacent left and right green filter pixels, adjacent upper and lower cyan filter pixels, and adjacent four diagonal yellow filter pixels. Assume that crosstalk components from the left/right green filter pixels sum to G", from the upper/lower cyan filter pixels sum to Cy", and from the diagonal yellow filter pixels sum to Ye". In addition, assume that the crosstalk components from the respective adjacent pixels are designated as C1, C2, C3, C4, C5, C6, C7, and C8 as illustrated in FIG. 3A. In that case, the crosstalk components G", Cy", and Ye" are expressed by the following Equations (1):

$$G''=C4+C8$$

$$Cy''=C2+C6$$

$$Ye''=C1+C3+C5+C7 \quad (1)$$

Assume that an optical signal after passing through the yellow filter pixel having no crosstalk is designated as Ye. In that case, an optical signal Ye' after passing through the yellow filter pixel with crosstalk is expressed by the following Equation (2):

$$Ye'=Ye+G''+Cy''+Ye'' \quad (2)$$

The crosstalk component Ye" from the diagonal yellow filter pixels is small compared with the crosstalk components G" and Cy", and such crosstalk component Ye" may be ignored.

Figure 3B:
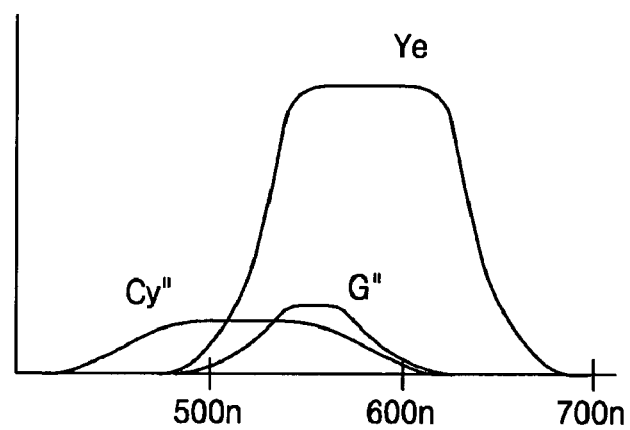

FIG. 3B is a plot of the spectral characteristics of the yellow filter pixel including the crosstalk components G" and Cy" affecting the yellow filter pixel and the ideal (e.g., desired) spectral characteristic Ye (step S71 of FIG. 7). The abscissa is for the wavelength (frequency) of light, and the ordinate is for the transmission level of the color filter for the yellow filter pixel. Since the crosstalk components Cy" and G" have spectral characteristics different from the desired spectral characteristic Ye, the real spectral characteristic Ye' is changed from the desired spectral characteristic Ye due to the crosstalk from the cyan and green filter pixels.

Figure 3C:
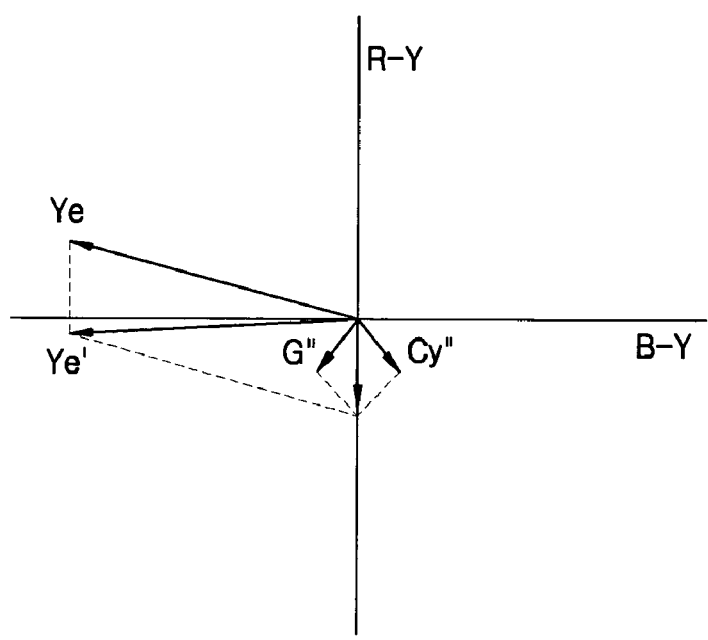

FIG. 3C illustrates Ye, Ye', G" and Cy" as vectors in a color space which is represented with color coordinates (step S72 of FIG. 7). The color space may be variously expressed such that the same color may be expressed in several color spaces. In the example of FIG. 3C, a phase and a magnitude of Ye, Ye', G" and Cy" are expressed using a color space of a blue minus yellow (B−Y) color component versus a red minus yellow (R−Y) color component.

Referring to FIG. 3C, Ye is transformed to Ye' due to the crosstalk components G" and Cy" from the green and cyan filter pixels. In FIG. 3C, the phase is changed from Ye to Ye' due to such crosstalk, but the magnitude is not significantly changed from Ye to Ye'. In other words, the intensity of the sensed light is not decreased, but the phase is changed from Ye to Ye' meaning that the spectral characteristic is changed due to the crosstalk.

Accordingly, each color filter of the yellow, green, and cyan filter pixels in the color filter array 200 is adjusted to compensate for such crosstalk. To this end, the phase to be compensated for and resulting from the crosstalk components G" and Cy" is calculated in the color space (step S73 in FIG. 7). In addition, a spectral shift for the spectral characteristic of the color filter is determined from the phase shift to compensate for the real spectral characteristic Ye' to the desired spectral characteristic Ye (step S74 of FIG. 7).

First, calculation of the phase shift between Ye and Ye' in FIG. 3C is now described with example values. Assuming that the crosstalk components G" and Cy" are −16 dB, the magnitude of the sum vector G"+Cy" is expressed by the following Equation (3):

$$|G'' + Cy''| = \frac{0.15 \times 2 \times 3^{0.5}}{2} = 0.26 \quad (3)$$

Figure 3D:
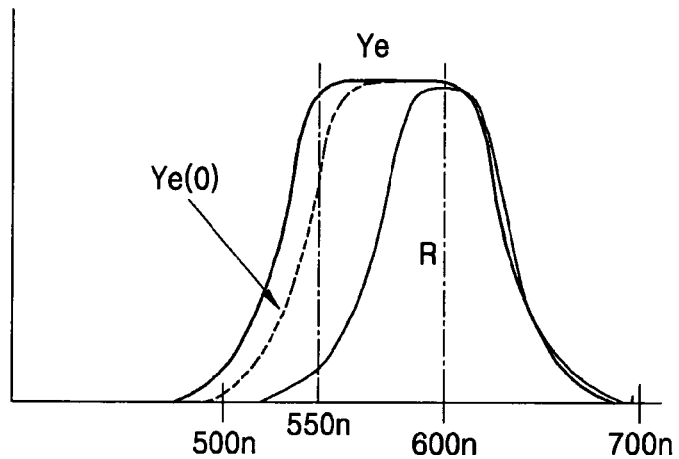
Figure 3E:
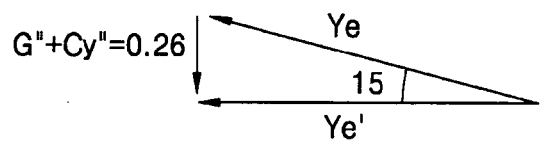

FIG. 3E illustrates vectors Ye and Ye' and sum crosstalk component G"+Cy" in the color space. If the angle between the sum crosstalk component G"+Cy" and Ye' is viewed in a vertical direction, the angle between Ye and Ye' is $\tan^{-1} 0.26=15°$. Thus, for reducing the crosstalk effect in the yellow filter pixel, the spectral characteristic of the yellow filter pixel is compensated by 15° in the color space.

Figure 3F:
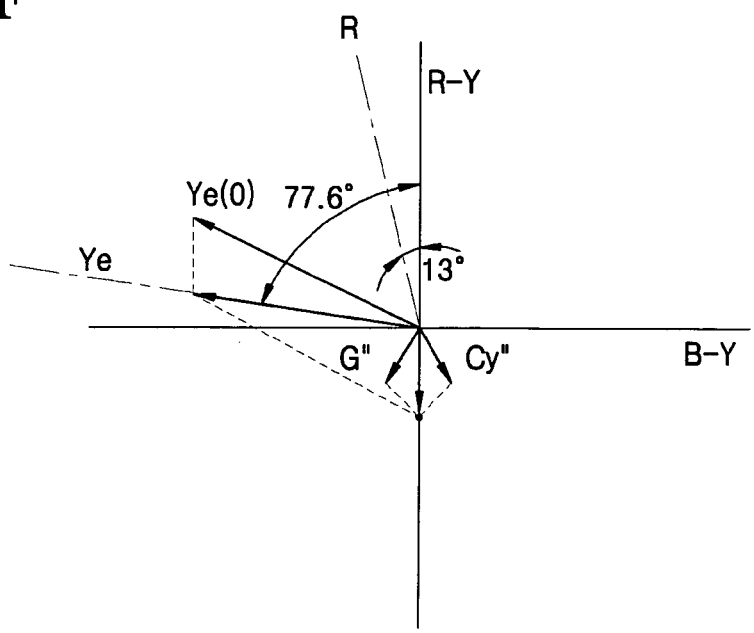
Figure 3G:
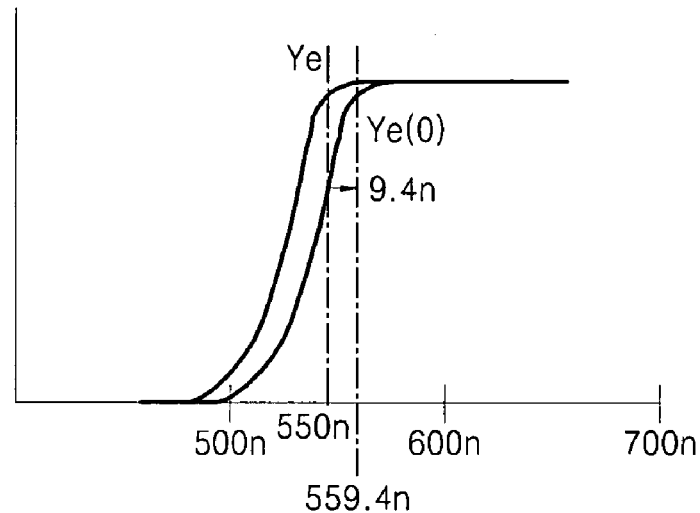

The spectral shift is then calculated using FIGS. 3F and 3G. In order to convert the phase shift in the color space into a spectral shift value, an amount of the spectral shift is calculated using a vector R in FIG. 3F and a spectral characteristic for red. Referring to FIG. 3F, the vector R in the color space is separated from the vector Ye by an angle of 80°.

As illustrated in FIG. 3D, the vector R corresponds to the spectral characteristic having a maximum transmission level at 600 nm. Since the vector Ye is shifted away from the vector R due to the crosstalk components G" and Cy", the spectral characteristic of the yellow filter pixel must be shifted toward the vector R by a phase corresponding to the angle of 15° in the color space to compensate for the crosstalk effect. The spectral interval corresponding to the angle of 15° in the color space is calculated by the following Equation (4):

$$\Delta(Ye) = (600 \text{ nm} - 550 \text{ nm}) \times \left(\frac{15°}{80°}\right) = 9.4 \text{ nm} \quad (4)$$

Thus, the resulting spectral characteristic Ye(0) for the color filter of the yellow filter pixel is determined as being shifted toward the higher red spectral characteristic R by 9.4 nm from the initial spectral characteristic Ye as illustrated in FIG. 3G.

Referring to FIGS. 3G and 7, the composition and the composition ratio of the pigments in the color filter for the yellow filter pixel is adjusted for achieving the resulting spectral characteristic Ye(0) (step S75 of FIG. 7). The color filter for the yellow filter pixel is fabricated accordingly such that the real spectral characteristic Ye' is compensated to the desired spectral characteristic Ye even with the crosstalk components G" and Cy".

FIGS. 4A, 4B, 4C, 4D, 4E, 4F, and 4G are views illustrating a process of obtaining a respective desired spectral characteristic of a cyan filter pixel that is compensated for crosstalk effect, according to an embodiment of the present invention.

Figure 4A:
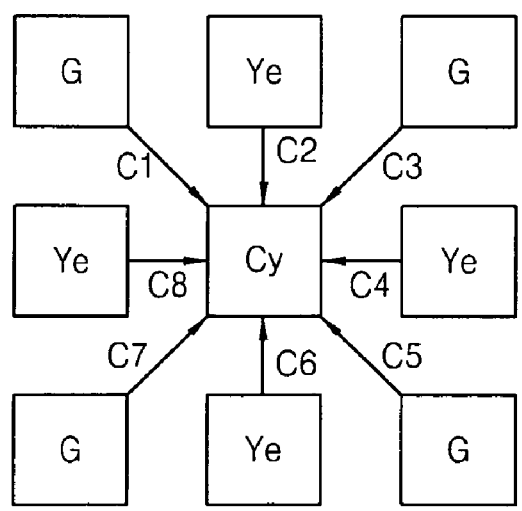
FIGS. 4A, 4B, 4C, 4D, 4E, 4F, and 4G are views illustrating a process of obtaining a respective desired spectral characteristic of a cyan filter pixel that is compensated for crosstalk effect, according to an embodiment of the present invention.

Referring to FIG. 4A, the cyan filter pixel is affected by crosstalk from adjacent upper/lower/left/right yellow filter pixels and adjacent diagonal green filter pixels. Assume that crosstalk components from the upper/lower/left/right yellow filter pixels sum to Ye" and that crosstalk components from the diagonal green filter pixels sum to G". In addition, assume that crosstalk components from the respective adjacent pixels are designated as C1, C2, C3, C4, C5, C6, C7, and C8 as illustrated in FIG. 4A. In that case, the crosstalk components G" and Ye" may be expressed by the following Equations (5):

$$Ye''=C2+C4+C6+C8$$

$$G''=C1+C3+C5+C7 \quad (5)$$

Assume that an optical signal generated by passing through the cyan filter pixel with no crosstalk effect is designated as Cy. In that case, an optical signal Cy' generated by passing through the cyan filter pixel with crosstalk effect is expressed by the following Equation (6):

$$Cy'=Cy+G''+Ye'' \quad (6)$$

The crosstalk component G" from the diagonal green filter pixels is insignificant compared with the crosstalk component Ye" such that the crosstalk component G" may be ignored.

Figure 4B:
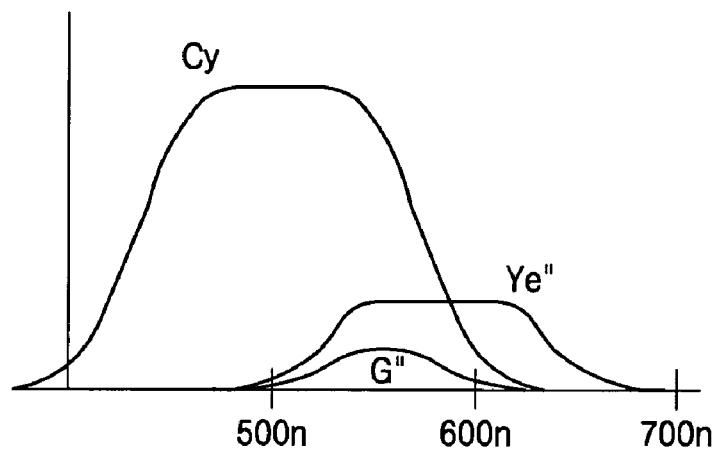

FIG. 4B is a plot of spectral characteristics for the cyan filter pixel including the crosstalk components Ye" and G" that affect the cyan filter pixel, similar for the yellow filter pixel n FIG. 3B (step S71 of FIG. 7). The crosstalk components Ye" and G" have spectral characteristics different from an ideal (desired) spectral characteristic Cy of the cyan filter pixel. Thus, the actual spectral characteristic Cy' of the cyan filter pixel is changed from the desired spectral characteristic Cy due to the crosstalk components Ye" and G".

Figure 4C:
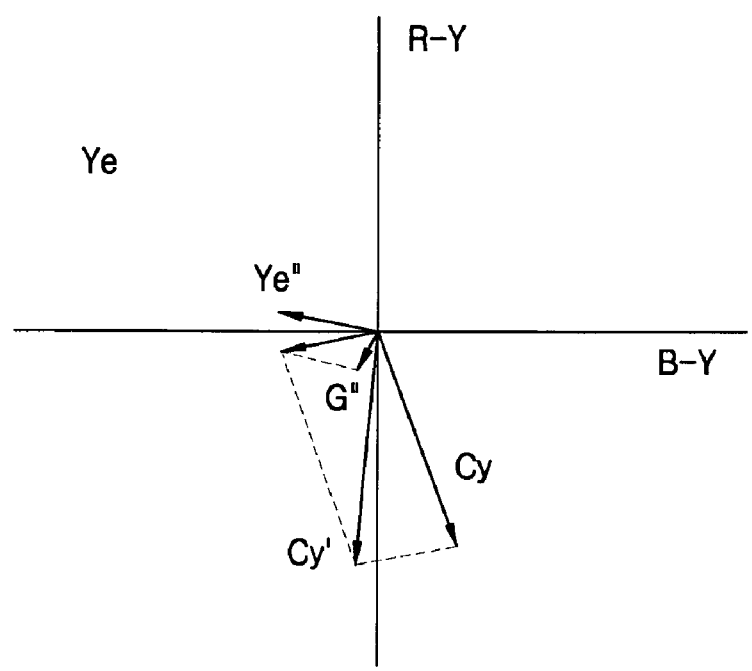

FIG. 4C illustrates the spectral characteristics Cy, Cy', Ye" and G" as vectors in a color space (step S72 of FIG. 7).

Referring to FIG. 4C, Cy is transformed to Cy' due to the crosstalk components Ye" and G". Thus, the phase is shifted from Cy to Cy' due to the crosstalk components Ye" and G". However, the magnitude is not significantly changed from Cy to Cy'. In other words, the intensity of the optical signal is not decreased from the crosstalk effect.

Nevertheless, the phase is shifted from Cy to Cy' meaning that the spectral characteristic is changed from Cy to Cy' due to the crosstalk components Ye" and G". The pigment(s) in the cyan color filter are adjusted to compensate for such change in the spectral characteristic.

First to that end, a phase difference between Cy and Cy' is determined (step S73 of FIG. 7). For example using illustrative values, assume that the crosstalk component Ye" is −10 dB=0.3, and that the sum of vectors Ye" and G" is different from the vector Ye" only in phase but the same as the vector Ye" in magnitude.

Figure 4D:
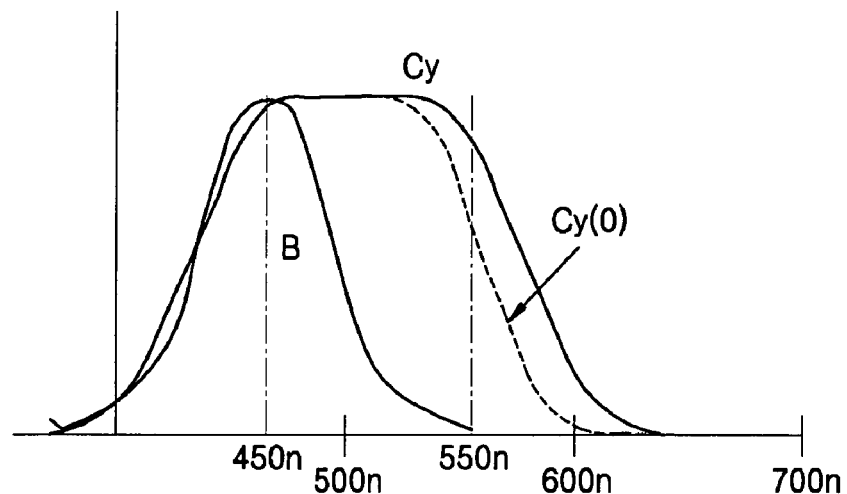
Figure 4E:
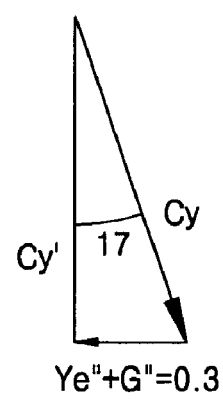

FIG. 4E illustrates Cy, Cy', and the crosstalk components Ye"+G". In the color space, as the angle between the crosstalk components Ye"+G" and Cy' is viewed in a vertical direction, the angle between Cy and Cy' is determined as $\tan^{-1} 0.3 = 17°$. Such a phase shift is then used to determine a spectral shift in the spectral characteristic of the cyan color filter to compensate for the crosstalk components Ye"+G" (step S74 of FIG. 7), using FIGS. 4F and 4G.

Figure 4F:
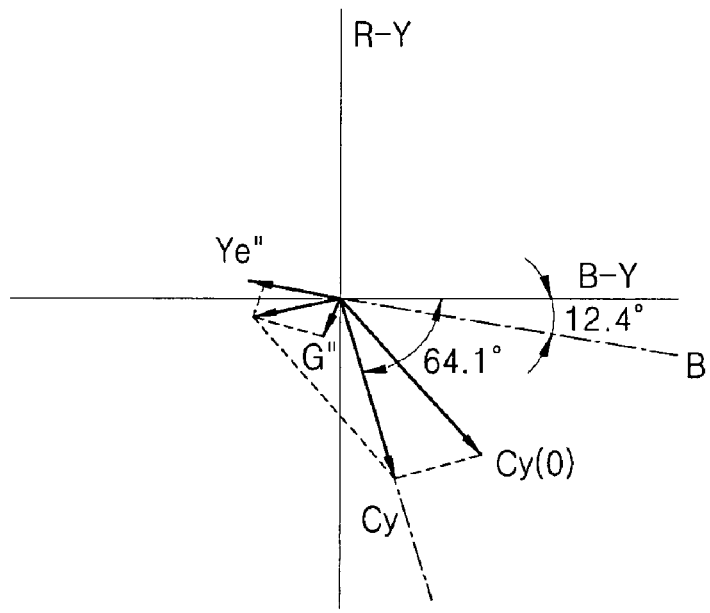
Figure 4G:
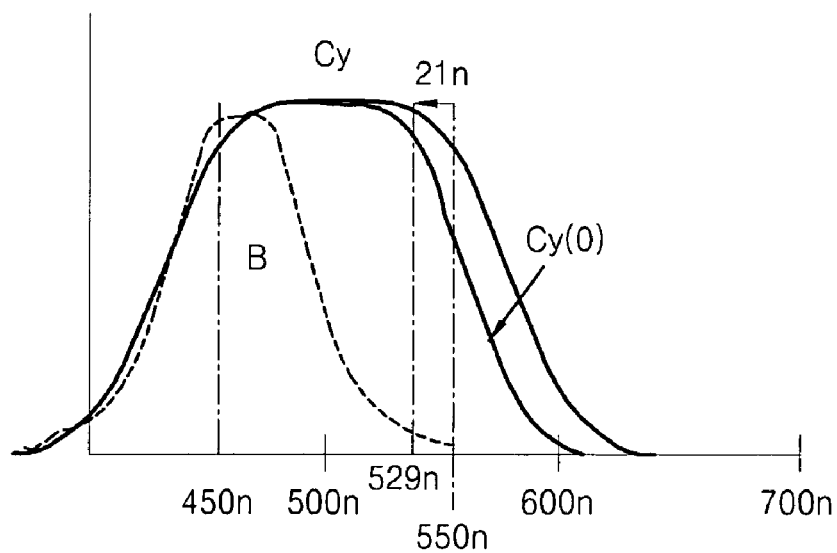

To convert a phase amount in the color space into a value on the frequency axis, a vector B representing a spectral characteristic for blue is used in FIGS. 4F and 4G. Referring to FIG. 4F, the vector B in the color space is separated from the vector Cy by an angle of 80°. As illustrated in FIG. 4D, the blue vector B corresponds to a spectral characteristic with a maximum transmission level at 450 nm.

The vector Cy is shifted to the vector Cy' in a direction away from the vector B due to the crosstalk components Ye" and G". Thus, the spectral characteristic of the cyan filter is desired to be shifted toward the blue vector B by a phase corresponding to the angle of 17° in the color space to compensate for the crosstalk components Ye" and G". The spectral shift corresponding to the phase shift of 17° in the color space is calculated by the following Equation (7):

$$\Delta(Cy) = (550 \text{ nm} - 450 \text{ nm}) \times \left(\frac{17°}{80°}\right) = 21 \text{ nm} \quad (7)$$

FIG. 4G shows a resulting spectral characteristic Cy(0) of the cyan filter pixel including such a spectral shift from the initial spectral characteristic Cy toward the lower frequencies of the blue spectral characteristic.

Referring to FIGS. 4G and 7, the composition and the composition ratio of the pigments in the color filter for the cyan filter pixel is adjusted for achieving the resulting spectral characteristic Cy(0) (step S75 of FIG. 7). The color filter for the cyan filter pixel is fabricated accordingly such that the real spectral characteristic Cy' is compensated to the desired spectral characteristic Cy even with the crosstalk components G" and Ye".

FIGS. 5A, 5B, 5C, 5D, 5E, 5F, and 5G are views illustrating a process of obtaining a respective desired spectral characteristic of a green filter pixel that is compensated for crosstalk effect, according to an embodiment of the present invention.

Figure 5A:
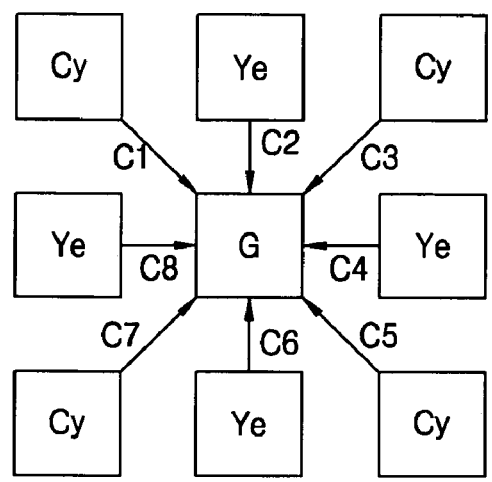
FIGS. 5A, 5B, 5C, 5D, 5E, 5F, and 5G are views illustrating a process of obtaining a respective desired spectral characteristic of a green filter pixel that is compensated for crosstalk effect, according to an embodiment of the present invention.

Referring to FIG. 5A, the green filter pixel G is affected by crosstalk from adjacent upper/lower/left/right yellow filter pixels Ye and adjacent diagonal cyan filter pixels Cy. Assume that crosstalk components from the upper/lower/left/right yellow filter pixels sum to Ye" and from the diagonal cyan filter pixels sum to Cy". Also assume that crosstalk components from the adjacent pixels are C1, C2, C3, C4, C5, C6, C7, and C8 as illustrated in FIG. 5A. In that case, the crosstalk components Cy" and Ye" are expressed as the following Equations (8):

$$Ye" = C2 + C4 + C6 + C8$$

$$Cy" = C1 + C3 + C5 + C7 \quad (8)$$

Further assume that an optical signal after passing through the green color filter with no crosstalk effect is designated as G. In that case, an optical signal G' passing through the green color filter with crosstalk effect is expressed as the following Equation (9):

$$G' = G + Cy" + Ye" \quad (9)$$

Since the crosstalk component Cy" from the diagonal cyan filter pixels is insignificant compared with the crosstalk component Ye" from the yellow filter pixels, the crosstalk component Cy" from the cyan filter pixels may be ignored.

Figure 5B:
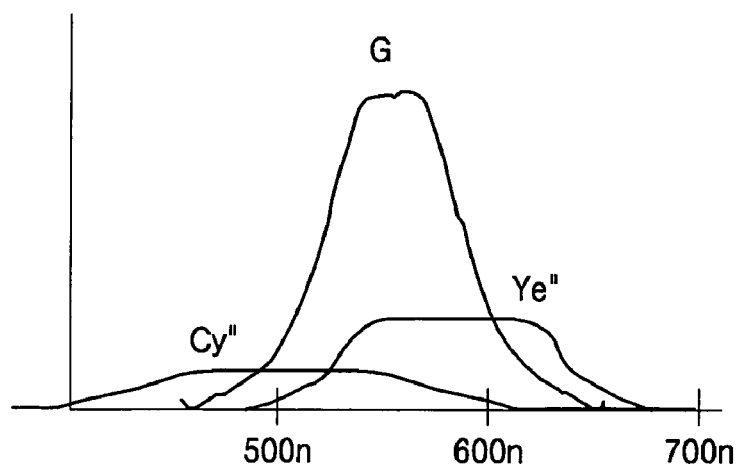

FIG. 5B shows spectral characteristics of G, Cy", and Ye" for the green filter pixel, similar to FIGS. 3B and 4B for the yellow and cyan filter pixels (step S71 of FIG. 7). The crosstalk components Ye" and Cy" have spectral characteristics that are different from the desired spectral characteristic G for the green filter pixel. Thus, the actual (i.e., real) spectral characteristic G' for the green filter pixel will be changed from the desired spectral characteristic G due to the crosstalk components Ye" and Cy".

Figure 5C:
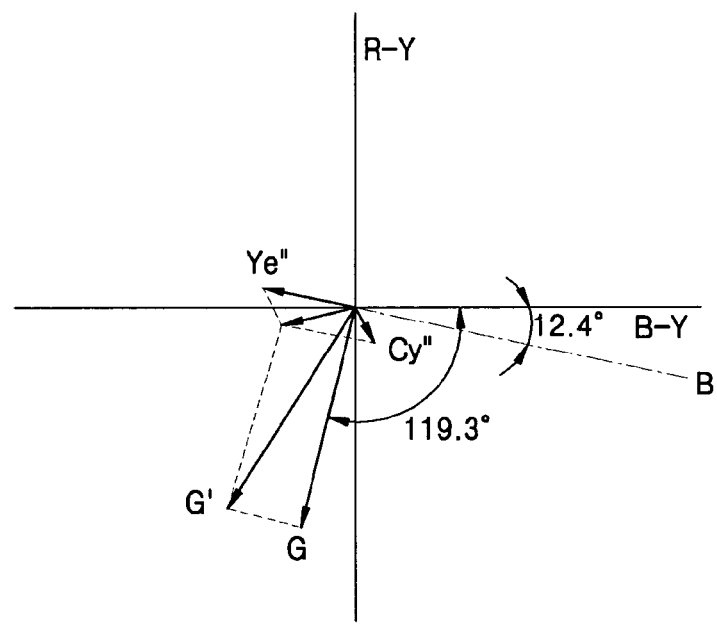

FIG. 5C illustrates G, G', Ye" and Cy" as vectors in a color space (step S72 of FIG. 7). An optical signal passing through the green filter pixel with no crosstalk effect is designated as vector G. An optical signal passing through the green filter pixel with crosstalk effect is designated as vector G'. Thus, G is transformed to G' due to the crosstalk components Ye" and Cy".

Further in FIG. 5C, the phase is changed from G to G' due to the crosstalk effect. However, the magnitude is not significantly changed from G to G' even with the crosstalk effect. In other words, the intensity of the optical signal is not decreased from the crosstalk effect. However, the phase is changed from G to G' meaning that the spectral characteristic of the optical signal through the green color filter is changed due to the crosstalk. The pigment(s) in the green color filter are adjusted to compensate for such change in the spectral characteristic.

First to that end, FIG. 5C illustrates determining the phase shift in the color space using illustrative values (step S73 of FIG. 7). For example, assume that the crosstalk component Ye" from the upper/lower/left/right yellow filter pixels is −10 dB=0.3, and that the sum of the vectors Ye" and Cy" is different from the vector Ye" only in phase but the same as the vector Ye" in magnitude.

Figure 5D:
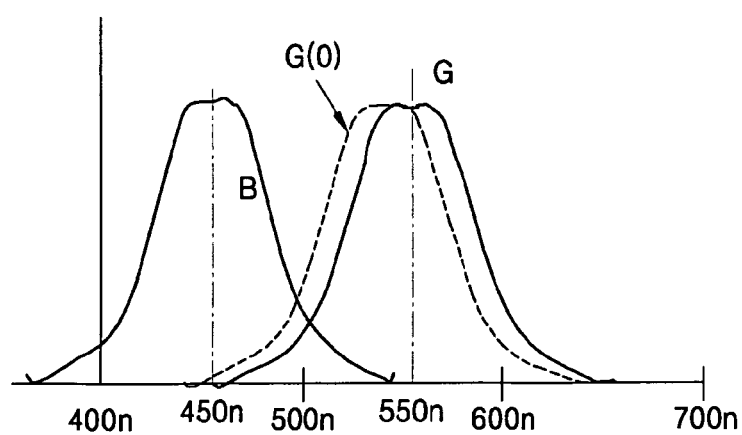
Figure 5E:
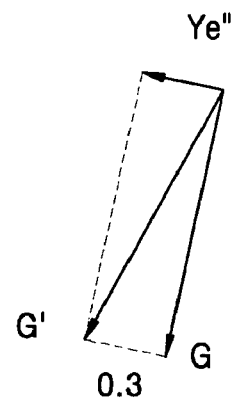

FIG. 5E illustrates G, G', and crosstalk components Ye"+ Cy" with the angle between the crosstalk components Ye"+ Cy" and G' being viewed in a vertical direction. In that example case, the angle between G and G' is $\tan^{-1} 0.3 = 17°$. Thus to compensate for the crosstalk components Ye"+Cy", the spectral characteristic of the cyan filter pixel is compensated by 17° in the color space, for reducing the crosstalk effect.

Figure 5F:
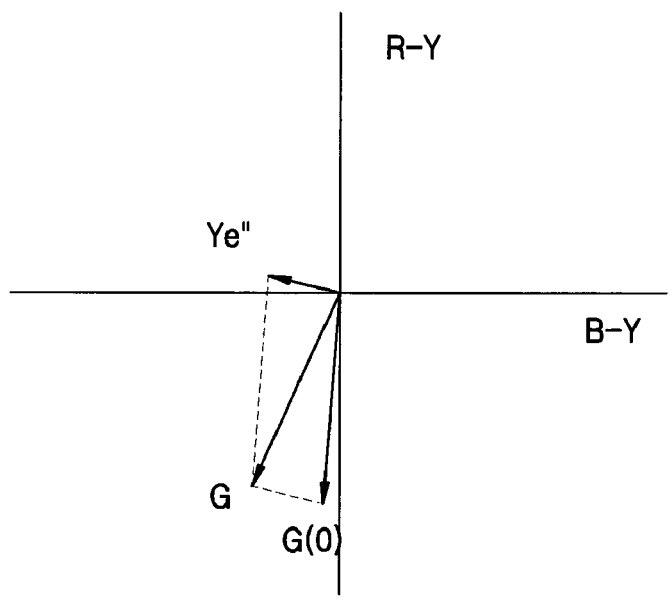
Figure 5G:
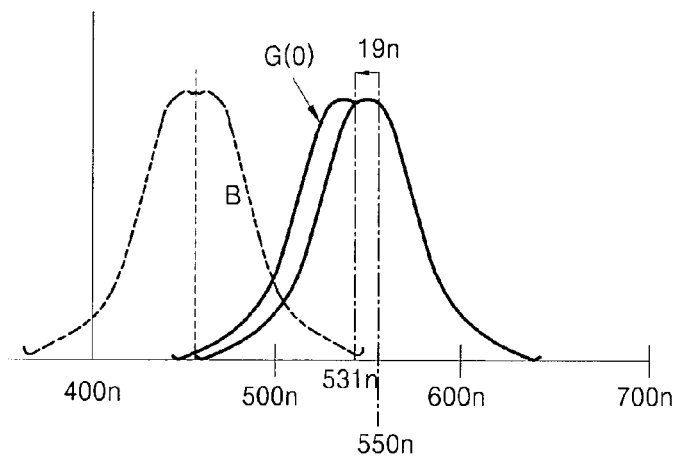

To convert a phase amount in the color space into a value on the frequency axis, a vector B representing a spectral characteristic for blue is used in FIGS. 5F and 5G (step S74 of FIG. 7). Referring to FIG. 5F, the vector B in the color space is separated from the vector G by an angle of 90°. As illustrated in FIG. 5D, the blue vector B corresponds to a spectral characteristic with a maximum transmission level at 450 nm.

Referring to FIG. 5C, the actual vector G' is shifted from the desired vector G in a direction away from the blue vector B due to the crosstalk from Ye" and Cy". Thus, the spectral characteristic of the green filter pixel must be shifted toward the blue vector B by a phase corresponding to the angle of 17° in the color space to compensate for the crosstalk effect. The spectral shift corresponding to the angle of 17° in the color space is calculated by the following Equation (10):

$$\Delta(G) = (550 \text{ nm} - 450 \text{ nm}) \times \left(\frac{17°}{90°}\right) = 19 \text{ nm} \quad (10)$$

FIG. 5G shows a resulting spectral characteristic G(0) of the green filter pixel including such a spectral shift from the initial spectral characteristic G toward the lower frequencies of the blue spectral characteristic.

Referring to FIGS. 5G and 7, the composition and the composition ratio of the pigments in the color filter for the green filter pixel is adjusted for achieving the resulting spectral characteristic G(0) (step S75 of FIG. 7). The color filter for the green filter pixel is fabricated accordingly such that the real spectral characteristic G' is compensated to the desired spectral characteristic G even with the crosstalk components G" and Ye".

In this manner, each of the green, cyan, and yellow color filters are compensated to offset the respective crosstalk effect, resulting in high color reproducibility. In addition, all of the green, cyan, and yellow color filters pass a light frequency component in the green frequency range such that images are captured with high sensitivity in the image sensor.

Figure 6:
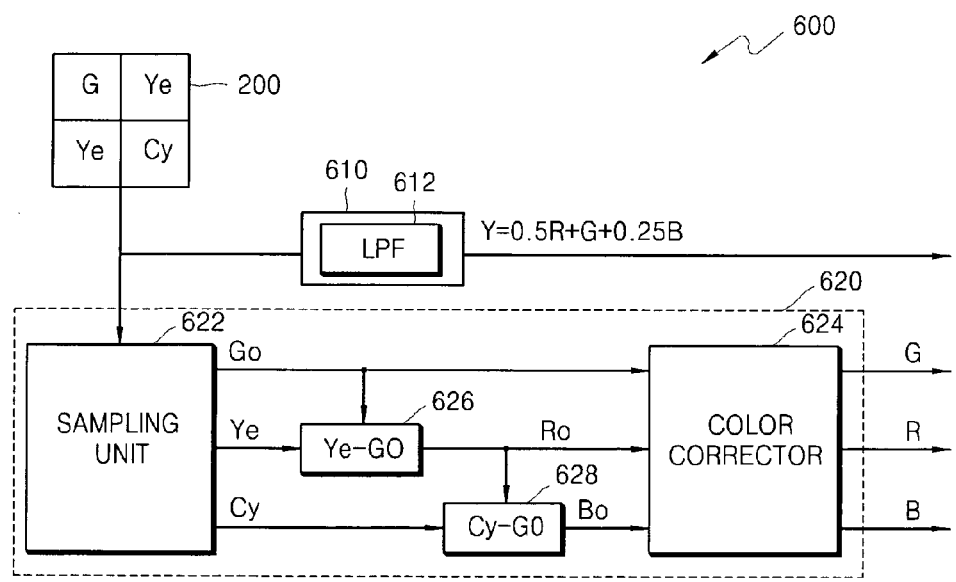
FIG. 6 is a block diagram of an image pickup apparatus including a signal processor, according to an embodiment of the present invention.

FIG. 6 is a block diagram of an image pickup apparatus including an image sensor with the color filter array 200 and a signal processor 600, according to an embodiment of the present invention. The image sensor converts an image into electric signals that are generated from the unit pixels.

The signal processor 600 converts an electric signal from a unit pixel of the image sensor including the green, yellow, and cyan color signals (i.e., secondary color signals) into green, red, and blue color signals (i.e., primary color signals). In addition, a luminance signal is also determined using the electric signal generated from the unit pixel of the image sensor. In the present embodiment, the electric signal outputted from the unit pixel is a sum of electric signals generated from the green, yellow, and cyan filter pixels.

A luminance generator 610 outputs a luminance that is determined from processing the electric signal of the unit pixel of the image sensor. In an example embodiment of the present invention, the luminance is generated by passing the electric signal of the unit pixel through a low pass filter (LPF) 612 in the luminance generator 610.

The luminance indicates brightness of light, and may be represented in the form of a linear combination of red, green, and blue color signals. The ideal linear combination for representing the luminance is expressed as the following Equation (11):

$$Y = G + 0.5R + 0.25B \quad (11)$$

Above, G, R, and B denote intensities of the green, red and blue outputs, respectively. The respective coefficients above may be changed with a constant ratio of the three coefficients.

Referring to FIGS. 2A and 2B of an embodiment of the present invention, each of the yellow, green, and cyan filter pixels has a same predetermined area, and the number of the yellow filter pixels is about two times that of each of the green and cyan filter pixels. Thus, the area ratio of the yellow, green, and cyan filter pixels in the color filter array 200 is 2:1:1.

A relationship between the yellow, green, and cyan outputs Ye, G, and Cy and the green, red, and blue outputs G, R, and B may be represented by the following Equation (12):

$$Ye = R + G$$

$$G = G$$

$$Cy = R + B \quad (12)$$

Since the output signal generated from the unit pixel is 2Ye+G+Cy, such output signal may be represented by the following Equation (13):

$$2Ye + G + Cy = 2(R + G) + G + G(G + B) \quad (13)$$
$$= 4G + 2R + B$$
$$= 4(G + 0.5R + 0.25B)$$

Accordingly, the luminance may be obtained by passing the output signal from the unit pixel through the LPF 612 without any operation on such an output signal.

Referring back to FIG. 6, a color converter 620 obtains green, red, and blue color signals (i.e., temporal primary color signals) from the output signal of the unit pixel. In the color converter 620, a sampling unit 622 separates the yellow, green, and cyan outputs from the output of the unit pixel having the yellow, green, and cyan outputs added together. Thus, the sampling unit 622 outputs such a green output as a temporal green output G0, a yellow output Ye, and a cyan output Cy.

The yellow and cyan outputs Ye and Cy are converted into temporal red and blue outputs R0 and B0, respectively. The yellow output Ye is converted into the temporal red output R0 by subtracting the temporal green output G0 from the yellow output Ye in a color converting unit 626. The cyan output Cy is converted into the temporal blue output B0 by subtracting the temporal green output G0 from the cyan output Cy in a color converting unit 628.

A color corrector 624 generates enhanced green, red, and blue outputs G, R, and B (i.e., enhanced primary color signals) from the temporal green, red, and blue outputs G0, R0, and B0 for increasing color purity and color reproducibility of the image sensor. The color corrector 624 performs a matrix operation according to the following matrix Equation (14):

$$\begin{pmatrix} R \\ G \\ B \end{pmatrix} = \begin{pmatrix} K11 & K12 & K13 \\ K21 & K22 & K23 \\ K31 & K32 & K33 \end{pmatrix} \begin{pmatrix} R0 \\ G0 \\ B0 \end{pmatrix} \quad (14)$$

In the present embodiment, as the purity of the temporal red, green, and blue signals R0, G0 and B0 increases, diagonal components K11, K22 and K33 of the above Equation (14) each become closer to "1". Also in that case, the other components K12, K13, K21, K23, K31 and K32 each become closer to "0".

On the other hand, when the purity of the temporal red, green, and blue signals R0, G0, and B0 decreases, the diagonal components K11, K22 and K33 are increased, and the other components K12, K13, K21, K23, K31 and K32 have high absolute values rather than "0". In that case, a signal is amplified, and the noise level of the signal is also increased such that the SNR (signal to noise ratio) and the color reproducibility is lowered.

In embodiments of the present invention, the color filters of the color filter array 200 are compensated for crosstalk effects to increase the purity of the temporal red, green and blue signals R0, G0 and B0. In that case, the diagonal components K11, K22 and K33 in the matrix Equation (14) above are close to "1", and the other components K12, K13, K21, K23, K31 and K32 are close to "0".

While the present invention has been particularly shown and described with reference to an exemplary embodiment thereof, it will be understood by those of ordinary skill in the art that various changes in form and details may be made therein without departing from the spirit and scope of the present invention as defined by the following claims.

The present invention is limited only as defined in the following claims and equivalents thereof.

What is claimed is:

1. A color filter array of an image sensor, the color filter array comprising:
    a plurality of repeating unit pixel patterns with each unit pixel pattern including:
    a respective primary color pixel for sensing a predetermined primary color, wherein said predetermined primary color is one of red, blue, and green that are primary colors of light;
    a respective first secondary color pixel for sensing a first secondary color that is not red, blue, and green; and
    a respective second secondary color pixel for sensing a second secondary color that is not red, blue, and green, wherein the second secondary color is different from the first secondary color;
    wherein one of the respective first and second secondary color pixels has a higher area ratio than the respective primary color pixel and the other of the respective first and second secondary color pixels in the unit pixel pattern,
    and wherein said one of the respective first and second secondary color pixels having the higher area ratio is not a luminance pixel.

2. The color filter array of claim 1, wherein the respective primary color pixel is a green filter pixel, the respective first secondary color pixel is a yellow filter pixel, and the respective second secondary color pixel is a cyan filter pixel.

3. The color filter array of claim 2, wherein the area ratio of the yellow filter pixel to the cyan filter pixel and the green filter pixel is 2:1:1 in the unit pixel pattern.

4. The color filter array of claim 3,
    wherein the two yellow filter pixels are diagonally aligned in the unit pixel pattern, and wherein the green filter pixel and the cyan filter pixel are diagonally aligned in the unit pixel pattern.

5. The color filter array of claim 1, wherein each of the respective primary color pixel, the respective first secondary color pixel, and the respective second secondary color pixel has a respective compensated spectral characteristic that minimizes crosstalk from a respective set of surrounding pixels.

6. An image sensor comprising:
    micro-lenses for gathering light;
    a color filter array for color-filtering the gathered light from the micro-lenses; and
    photo-sensing devices for transforming the color-filtered light from the color filter array into electric signals;
    wherein the color filter array includes:
    a plurality of repeating unit pixel patterns with each unit pixel pattern including:
    a respective primary color pixel for sensing a predetermined primary color, wherein said predetermined primary color is one of red, blue, and green that are primary colors of light;
    a respective first secondary color pixel for sensing a first secondary color that is not red, blue, and green; and
    a respective second secondary color pixel for sensing a second secondary color that is not red, blue, and green, wherein the second secondary color is different from the first secondary color;
    wherein one of the respective first and second secondary color pixels has a higher area ratio than the respective primary color pixel and the other of the respective first and second secondary color pixels in the unit pixel pattern,
    and wherein said one of the respective first and second secondary color pixels having the higher area ratio is not a luminance pixel.

7. The image sensor of claim 6, wherein the respective primary color pixel is a green filter pixel, the respective first secondary color pixel is a yellow filter pixel, and the respective second secondary color pixel is a cyan filter pixel.

8. The image sensor of claim 7, wherein the area ratio of the yellow filter pixel to the cyan filter pixel and the green filter pixel is 2:1:1 in the unit pixel pattern.

9. The image sensor of claim 8,
    wherein the two yellow filter pixels are diagonally aligned in the unit pixel pattern, and wherein the green filter pixel and the cyan filter pixel are diagonally aligned in the unit pixel pattern.

10. The image sensor of claim 9, wherein each of the respective primary color pixel, the respective first secondary color pixel, and the respective second secondary color pixel has a respective compensated spectral characteristic that minimizes crosstalk from a respective set of surrounding pixels.

11. The image sensor of claim 6, wherein the image sensor is a CMOS image sensor (CIS).

12. An image pickup apparatus comprising:
    an image sensor with a color filter array including:
    a plurality of repeating unit pixel patterns with each unit pixel pattern including:
    a respective primary color pixel for sensing a predetermined primary color, wherein said predetermined primary color is one of red, blue, and green that are primary colors of light;
    a respective first secondary color pixel for sensing a first secondary color that is not red, blue, and green; and
    a respective second secondary color pixel for sensing a second secondary color that is not red, blue, and green, wherein the second secondary color is different from the first secondary color;
    and wherein one of the respective first and second secondary color pixels has a higher area ratio than the respective primary color pixel and the other of the respective first and second secondary color pixels in the unit pixel pattern,
    and wherein said one of the respective first and second secondary color pixels having the higher area ratio is not a luminance pixel; and
    a signal processor for converting signals from the image sensor into primary color signals.

13. The image pickup apparatus of claim 12, wherein the respective primary color pixel is a green filter pixel, the respective first secondary color pixel is a yellow filter pixel, and the respective second secondary color pixel is a cyan filter pixel.

14. The image pickup apparatus of claim 13, wherein the area ratio of the yellow filter pixel to the cyan filter pixel and the green filter pixel is 2:1:1 in the unit pixel pattern.

15. The image pickup apparatus of claim 14,
wherein the two yellow filter pixels are diagonally aligned in the unit pixel pattern, and wherein the green filter pixel and the cyan filter pixel are diagonally aligned in the unit pixel pattern.

16. The image pickup apparatus of claim 15, wherein the signal processor includes:
a luminance generator for generating a luminance signal from an output signal generated by the unit pixel pattern;
a color converter for generating temporal primary color signals from the output signal generated by the unit pixel pattern; and
a color corrector for generating enhanced primary color signals from the temporal primary color signals.

17. The image pickup apparatus of claim 12, wherein each of the respective primary color pixel, the respective first secondary color pixel, and the respective second secondary color pixel has a respective compensated spectral characteristic that minimizes crosstalk from a respective set of surrounding pixels.

18. The image pickup apparatus of claim 12, wherein the image sensor is a CMOS image sensor (CIS).

* * * * *